US006487013B2

(12) United States Patent
Ramstad

(10) Patent No.: US 6,487,013 B2
(45) Date of Patent: Nov. 26, 2002

(54) FOLDING PRISM STEREOSCOPE

(76) Inventor: Monte Jerome Ramstad, 211 Ridgecrest Dr., Cannon Falls, MN (US) 55009

( * ) Notice: Subject to any disclaimer, the term of this patent is extended or adjusted under 35 U.S.C. 154(b) by 0 days.

(21) Appl. No.: 09/876,365

(22) Filed: Jun. 7, 2001

(65) Prior Publication Data

US 2002/0001129 A1 Jan. 3, 2002

Related U.S. Application Data

(63) Continuation of application No. 09/619,429, filed on Jul. 19, 2000.
(60) Provisional application No. 60/144,851, filed on Jul. 20, 1999.

(51) Int. Cl.[7] ........................... G02B 27/22; G02B 23/00
(52) U.S. Cl. ....................... 359/466; 359/408; 359/474; 359/476
(58) Field of Search ................................. 359/462, 466, 359/473, 474, 476, 477, 408, 411–413, 415

(56) References Cited

U.S. PATENT DOCUMENTS

| 1,097,601 | A | 5/1914 | Maerz | |
|---|---|---|---|---|
| 1,194,057 | A | 8/1916 | Murphy | |
| 1,743,952 | A | 1/1930 | Barr et al. | |
| 2,225,602 | A | 12/1940 | Ryker | 88/29 |
| 2,334,483 | A | 11/1943 | Dennis | 88/29 |
| 2,366,228 | A | 1/1945 | Abrams et al. | 88/29 |
| 2,396,510 | A | 3/1946 | Hulst | 88/29 |
| 3,298,772 | A | 1/1967 | Milinowski | 8/57 |
| 3,592,524 | A | 7/1971 | Schlienger | 350/137 |
| 3,847,467 | A | 11/1974 | Lewis | 350/140 |
| 4,124,798 | A | 11/1978 | Thompson | 250/213 |
| 4,253,732 | A | 3/1981 | Carver | 350/140 |
| 4,457,584 | A | 7/1984 | Pryor | 350/137 |
| 4,549,785 | A | 10/1985 | Vitrac | 350/140 |
| 4,660,931 | A | 4/1987 | Chevalier | 350/140 |
| 4,744,633 | A | 5/1988 | Sheiman | 350/132 |
| 409,927 | A | 8/1989 | Clements | |
| 4,913,541 | A | 4/1990 | Wakayama et al. | 350/546 |
| 4,998,799 | A | 3/1991 | Brown | 350/133 |
| 502,450 | A | 8/1993 | Wagner | |
| 5,270,751 | A | 12/1993 | Christian | 353/7 |
| 5,384,655 | A | 1/1995 | Sullivan et al. | 359/472 |
| 5,615,046 | A | 3/1997 | Gilchrist | 359/464 |
| 5,943,165 | A | 8/1999 | Huang | 359/472 |
| 5,954,642 | A | 9/1999 | Johnson et al. | 600/300 |
| 6,046,850 | A | 4/2000 | Cunanan | 359/472 |

*Primary Examiner*—Mark A. Robinson
*Assistant Examiner*—Jennifer Winstedt
(74) *Attorney, Agent, or Firm*—Kinney & Lange, P.A.

(57) ABSTRACT

A stereoscopic viewing apparatus for viewing side-by-side complimentary stereoscopic image pairs of various sizes to produce a three-dimensional effect, the stereoscopic viewing apparatus comprising a pair of left and right spaced-apart ocular windows and variable septa.

19 Claims, 7 Drawing Sheets

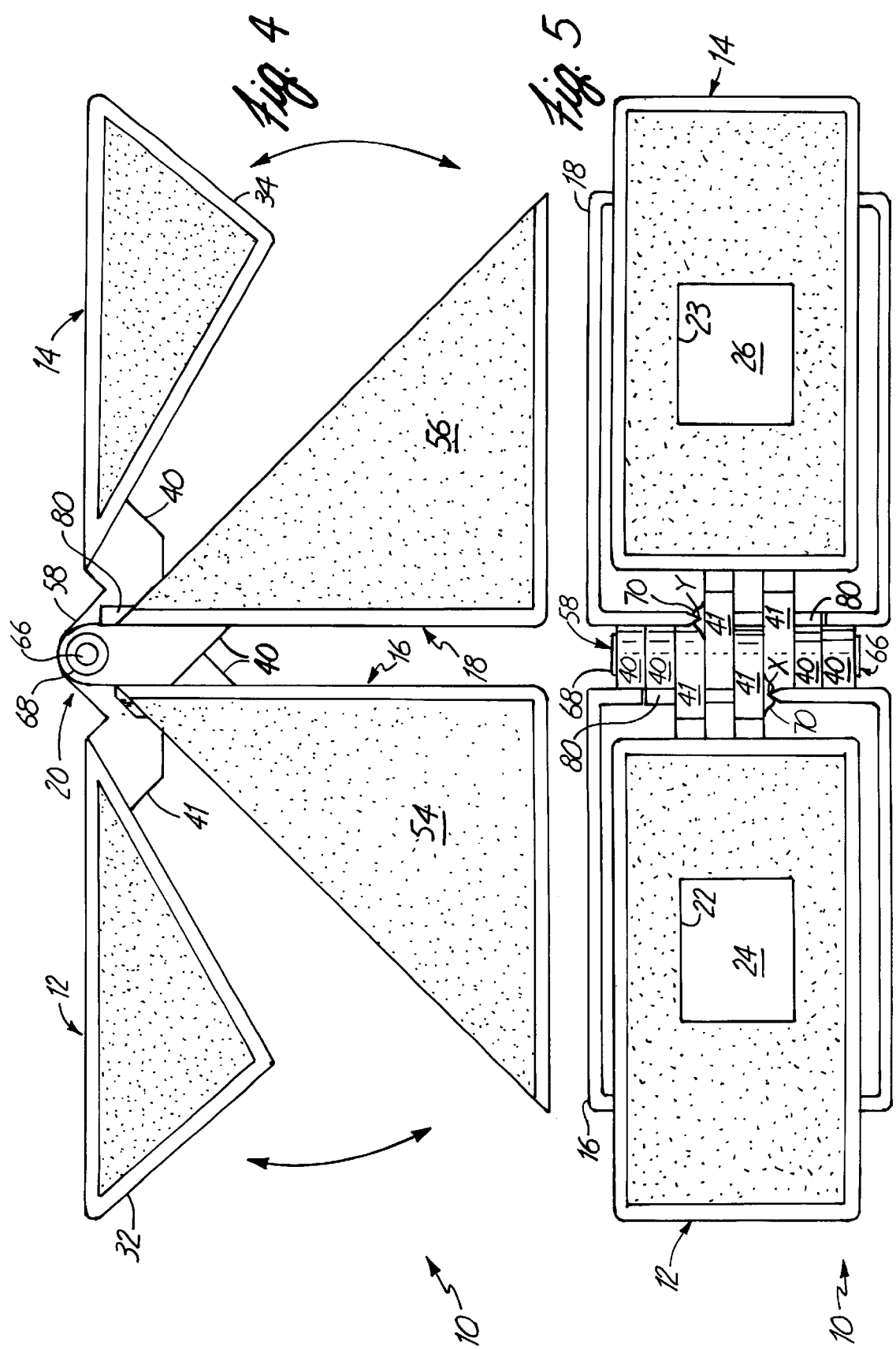

FOLDING PRISM STEREOSCOPE

CROSS-REFERENCE TO RELATED APPLICATION(S)

This application is a continuation of U.S. application Ser. No. 09/619,429 filed on Jul. 19, 2000, which claims the benefit of U.S. Provisional Patent Application No. 60/144,851 filed on Jul. 20, 1999.

BACKGROUND OF THE INVENTION

The present invention relates to the field of stereoscopes. In particular, the present invention relates to a prism stereoscope for viewing stereoscopic image pairs.

Stereoscope viewing apparatuses have been known since 1833 when Sir Charles Wheatstone, a British inventor, came up with the idea of using drawings and a viewing device to produce three dimensional images. The drawings included two side-by-side complementary images, each image drawn from a slightly different perspective. When placed a fixed distance from a users eyes, and with the help of a septum, the images fuse together to produce a three dimensional effect.

As the stereoscope technology advanced, side-by-side complementary photographs took the place of the drawings. Over the years, many types of stereoscopes have been used. The following patents describe such examples:

| INVENTOR | PAT. NO. |
|---|---|
| Wagner | 502,450 |
| Maerz | 1,097,601 |
| Murphy | 1,194,057 |
| Barr et al. | 1,743,952 |
| Schlienger | 3,592,524 |
| Lewis | 3,847,467 |
| Thompson | 4,124,798 |
| Carver | 4,253,732 |
| Pryor | 4,457,584 |
| Vitrac | 4,549,785 |
| Chevalier | 4,660,931 |
| Brown | 4,998,799 |
| Christian | 5,270,751 |
| Sullivan et al. | 5,384,655 |
| Gilchrist | 5,615,046 |
| Huang | 5,943,165 |
| Johnson et al. | 5,954,642 |
| Cunanan | 6,046,850 |

The side-by-side format is a popular method of displaying stereo-paired images. Commercial stereoscopes, such as the Holmes/Bates and Viewmaster® stereoscopes typically contain lenses combined with prisms. Lenses magnify the images and allow the user to focus on the images a few inches from the user's eyes. The prisms also translate the images to the center of the user's field of view. This aids the user in fusing the images in binocular vision.

Many commercial stereoscopes incorporate prisms intrinsically as a property of the lens. Lenses in stereoscopes define a limited range of viewing distances for which the user can focus on stereoscopic images. The limited range, together with the amount of prism action, define the maximum separation of the images that can be fused. Therefore, either the stereoscope determines the allowable image separations or the image separation determines the required properties of the stereoscope.

The use of standard image sizes became popular early on in order to allow standard stereoscopes to be used to view many images. However, images are increasingly being printed or viewed in non standard sizes. Non-standard sized images are frequently encountered when a computer monitor is used to view the stereo-images. This is because the size of the images depends on the properties of the monitor, including monitor settings such as pixel density, and the pixel dimensions of the images. Stereoscopes often use a septum to block out the periphery around the images including the well-known side images which cause visual rivalry between the left and the right views. The optimal dimensions of the septa are determined by the distance between the stereoscope and the stereo-image pairs and the properties of the lenses. In traditional stereoscopes, the septum has a fixed geometry.

To aid the viewing of non-standard size images, various stereoscopes have been designed using prisms or mirror boxes. Mirror boxes typically allow large images of a particular size to be viewed at any distance. If the mirror box can be translated outward, a range of large image sizes can be used at any reasonable distance. However, mirror box stereoscopes are typically as wide as the distance between the centers of the images being viewed.

Stereoscopes which use prisms but no lenses can be used to view images of any size from the common standard print sizes up to arbitrarily large sizes. The user adjusts the viewing distance until the stereo images fuse together. Prism stereoscopes often include masks to block out the well known side images which create vision disparities between the left and right eyes. Ideally, the masks should block out all of the periphery from the fused image.

BRIEF SUMMARY OF THE INVENTION

The present invention is a stereoscopic viewing apparatus for viewing side-by-side complimentary pairs of stereo images. The stereoscopic viewing apparatus of the present invention includes a pair of ocular members and a pair of objective members. In use, the ocular members are placed proximate to a user's eyes, and the objective members are adjusted to define a field of view. The objective members are adjusted depending upon the size of the stereo images and the distance the stereo images are from the viewing apparatus. With the objective members properly adjusted, the user perceives a three-dimensional image.

BRIEF DESCRIPTION OF THE DRAWINGS

FIG. 4 is a side view of the present invention in a second coupled position.

FIG. 5 is an ocular view of the present invention in the fully opened coupled state.

DETAILED DESCRIPTION

Figure 1:
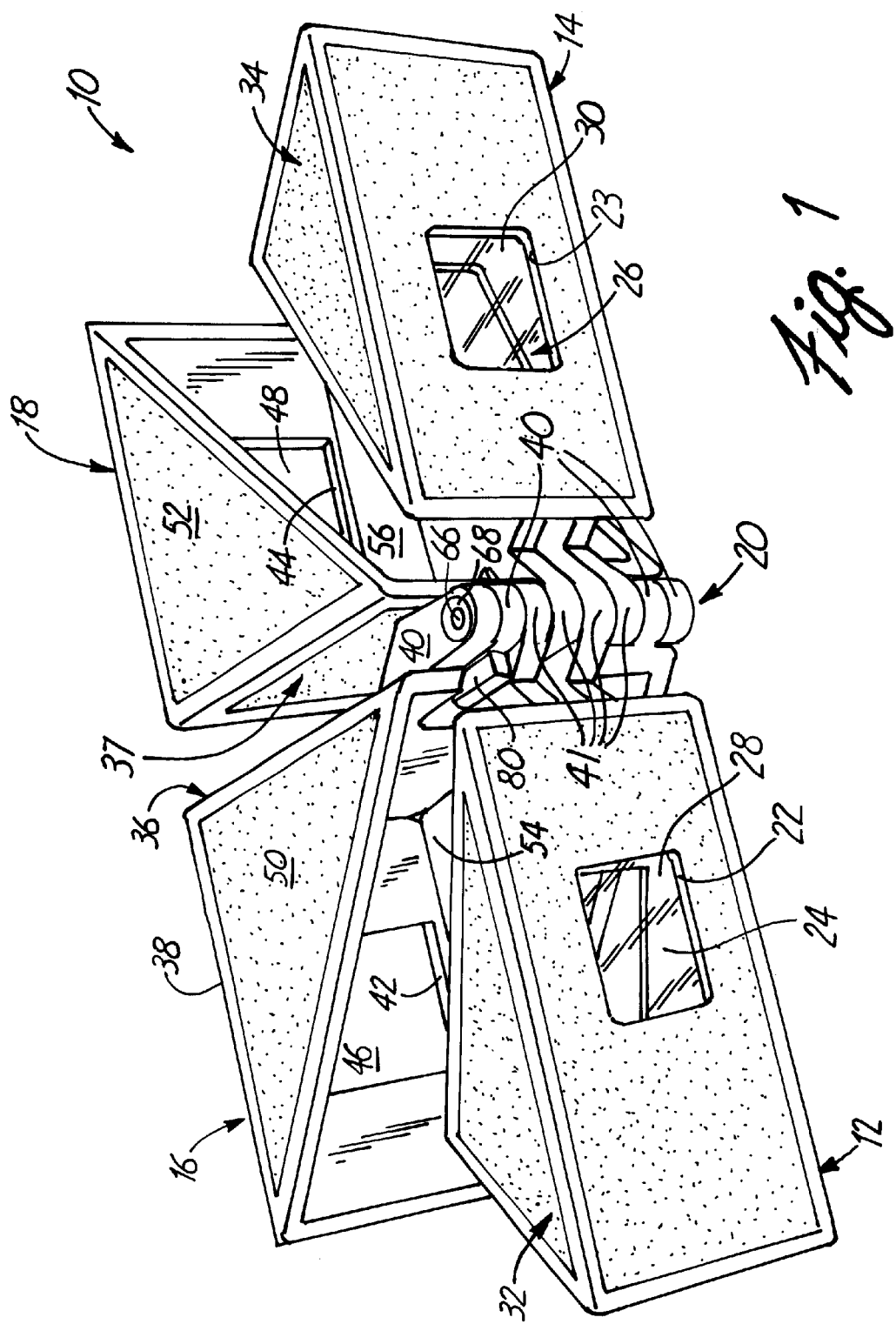
FIG. 1 is a perspective view of the present invention in a fully open coupled state.

The stereoscopic viewing apparatus of the present invention is indicated generally at 10 in FIG. 1. The stereoscopic viewing apparatus 10 is a binocular apparatus including a first pair of left and right spaced-apart ocular members 12, 14 respectively, and a second pair of left and right spaced-apart objective members 16, 18, respectively. Each member 12, 14, 16, 18 is hingedly attached to a common linkage 20. The stereoscopic viewing apparatus could also be described as having left and right optical systems, each with a focal point near infinity.

Figure 2:
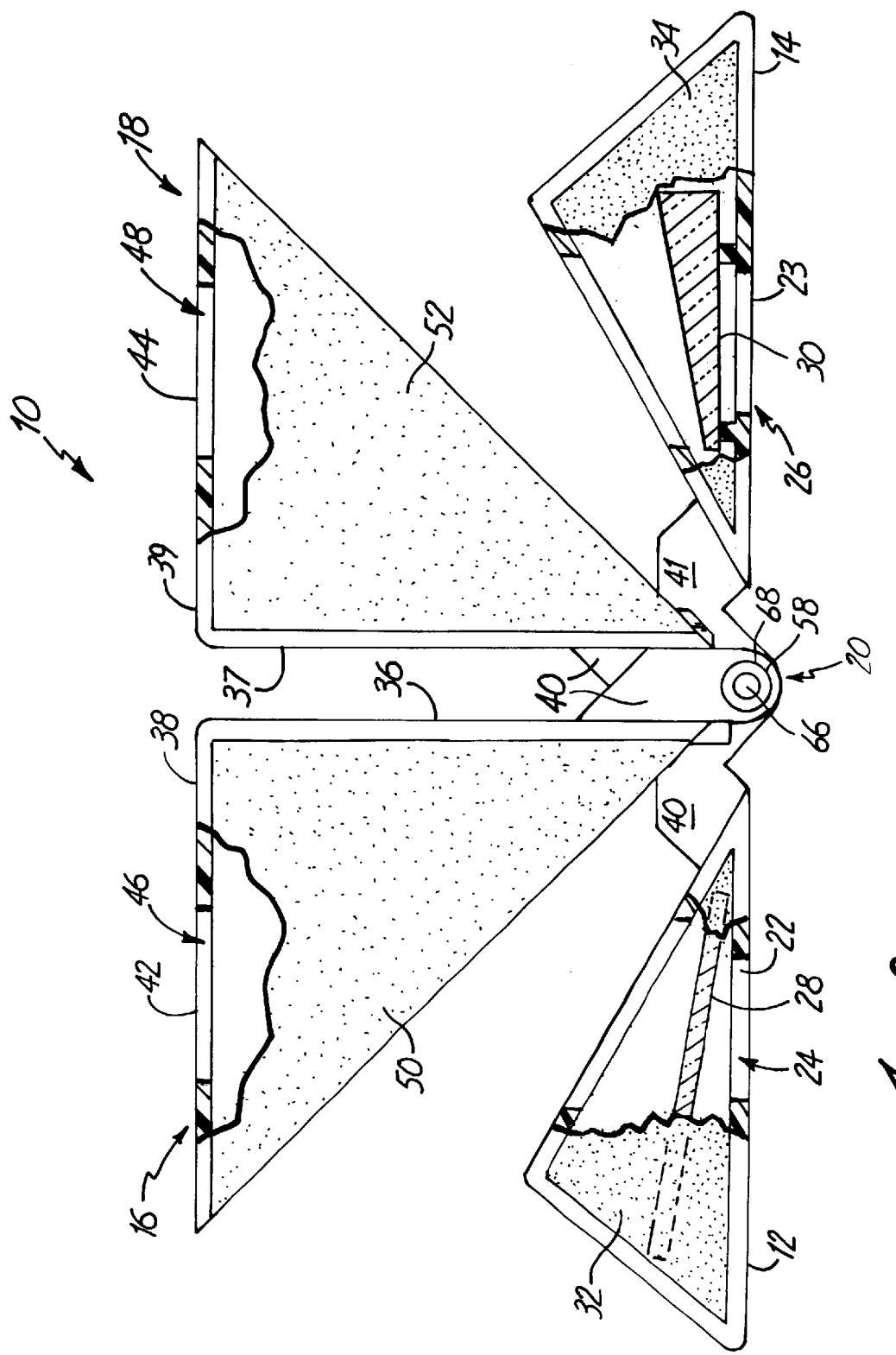
FIG. 2 is a partial sectional side view of the present invention in the fully open coupled state.

Each ocular member 12, 14 includes a surface 22, 23 defining a left ocular window 24 and a right ocular window 26, respectively. Prism lenses 28, 30 are positioned proximate to the left and right ocular windows 24, 26, respectively, as illustrated in FIG. 2. Each prism lens 28, 30 cooperates with the respective ocular window 24, 26, and has a substantially infinite focal length. A person skilled in the art will realize that the prism lenses 28, 30 can have either curved or flat surfaces.

Preferably, the ocular members 12, 14 further include masking walls 32, 34 attached thereto. The masking walls 32, 34 aid in shrouding the left and right windows 24, 26 of the respective ocular members 12, 14 thus restricting the amount of light allowed through the ocular windows 24, 26. It is also preferable to have each ocular member 12, 14 formed from a single piece of suitable plastic material.

The second pair of left and right spaced-apart objective members 16, 18 have an L-shaped configuration, including a first leg 36, 37 and a second leg 38, 39, respectively. Each objective member 16, 18 acts as a septum and is rotatably adjustable about the linkage 20. The left objective member 16 cooperates with the left ocular member 12, while the right objective member 18 cooperates with the right ocular member 14. A person skilled in the art will appreciate the advantages of having adjustable septa when viewing stereo-image pairs of varying sizes.

Preferably, the second legs 38, 39 of the left and right objective members 16, 18 each include a surface 42, 44 defining a left objective window 46 and right objective window 48, respectively. The left objective window 46 cooperates with the left ocular window 24 defining a left field of view. The right objective window 48 cooperates with the right ocular window 26 defining a right field of view. Each objective window 46, 48 is of a larger size relative to the corresponding ocular windows 24, 26.

Each objective member 16, 18 further includes a first wall 50, 52 and a second wall 54, 56. Each wall 50, 54 and 52, 56 attaches to an edge of the first and second legs 36, 38 and 37, 39 of the objective members 16, 18 respectively, which restricts the amount of light allowed to reach the ocular windows 24, 26. The walls also provide surfaces for gripping and handling the stereoscopic viewing apparatus 10. Preferably, each objective member 16, 18 is formed as a single piece from a suitable plastic such as by molding. In one embodiment, the walls 50, 52, 54, 56 have a textured surface or an anti-reflective coating to restrict unwanted reflections through the ocular windows 24, 26.

Figure 3:
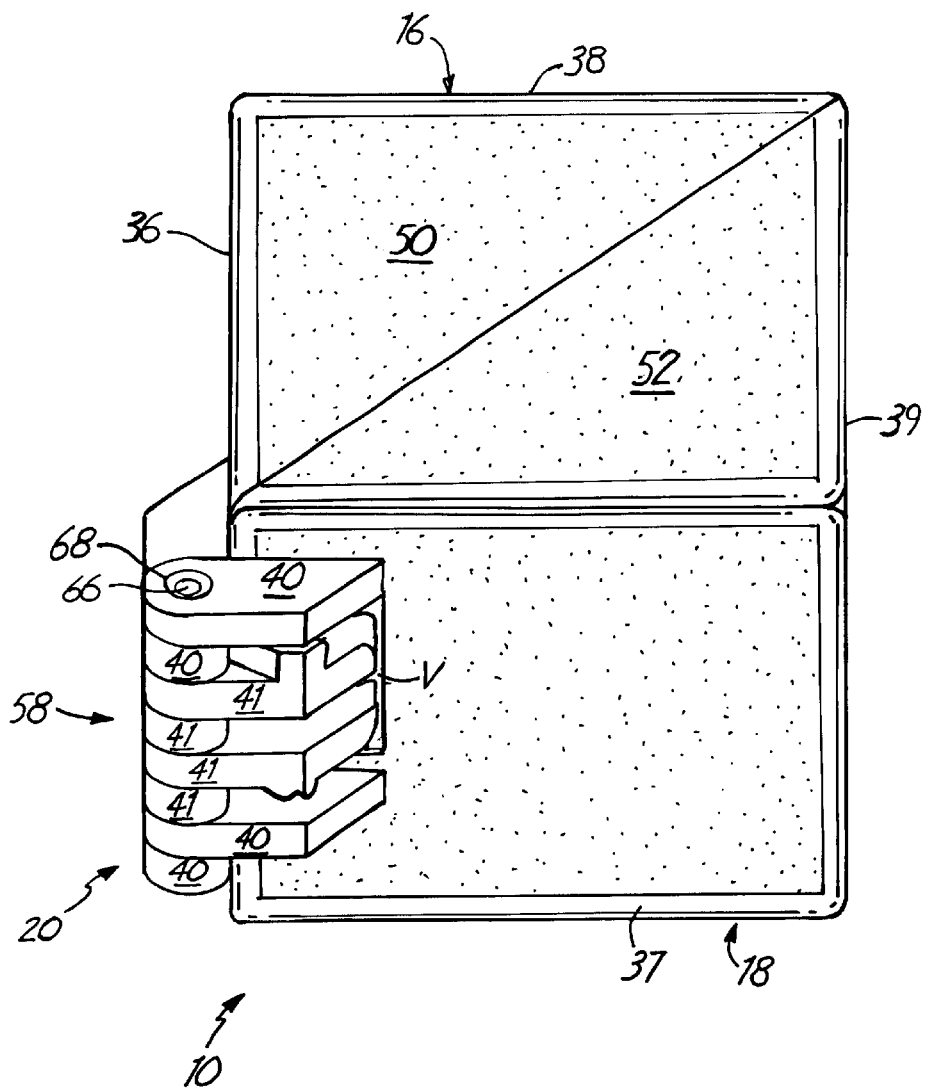
FIG. 3 is a perspective view of the present invention in a closed uncoupled state.

The common linkage 20 of the stereoscope viewing apparatus 10 allows the members 12, 14, 16, 18 to rotate about a hinge 58 in a coupled state or an uncoupled state. In the uncoupled state, each member 12, 14, 16, 18 is rotatable about hinge 58 over a range which includes a first closed position, as shown in FIG. 3. In the first position, the objective members 16, 18 enclose the ocular members 12, 14. The first position is the preferred position for storing or carrying the stereoscopic viewing apparatus 10 when not in use.

In the coupled state, the rotations of the left and the right ocular members are coupled to the rotations of the respective objective members 16, 18, and thus each ocular member 12, 14 remains at a fixed orientation with respect to the respective objective members 16, 18 independent of rotational position. FIGS. 1, 2, 4 and 5 show the stereoscope viewing apparatus 10 in the coupled state for two rotational positions. Preferably, the second legs 38, 39 of the objective members 16, 18, including the objective windows 46, 48, are positioned substantially parallel to the respective ocular members 12, 14 while coupled. However, some variation in the position of the second legs 38, 39 of the objective members 16, 18 while coupled with the ocular members 12, 14 is within the scope of the present invention.

Figure 6:
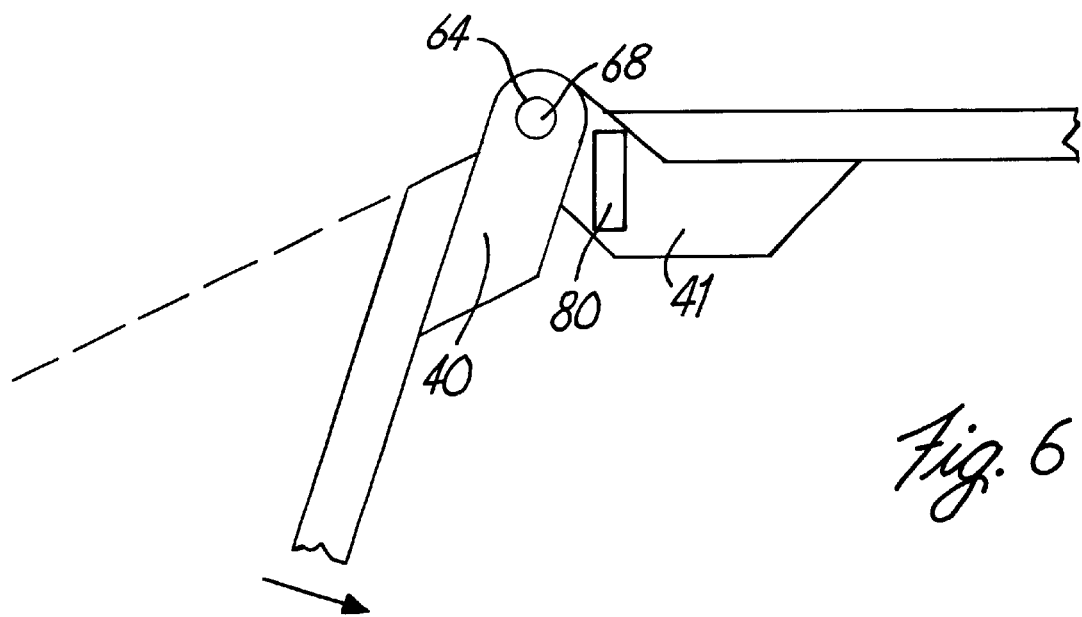
FIG. 6 is a plan view of a support arm cooperation.
Figure 7:
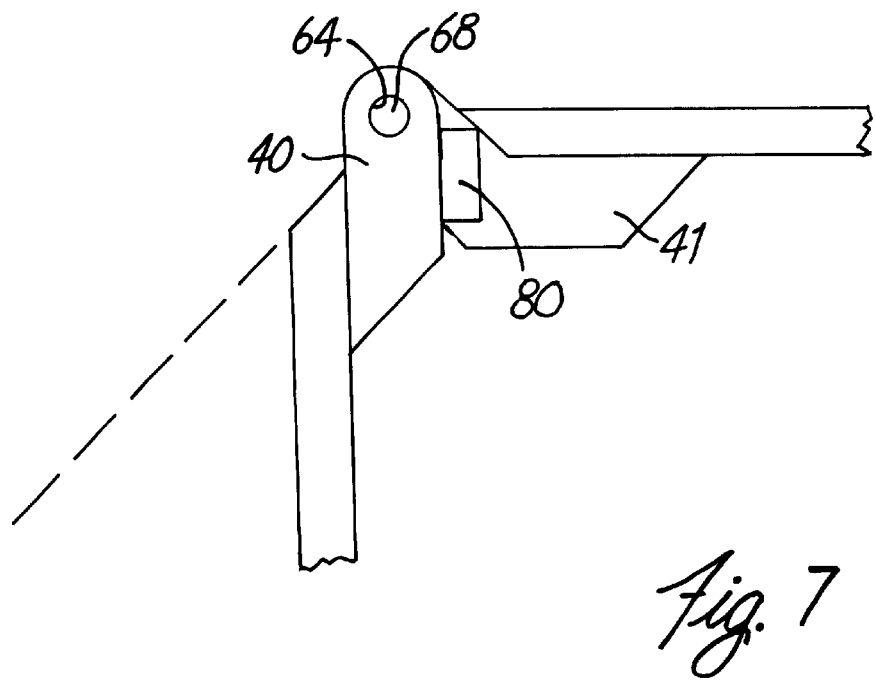
FIG. 7 is a plan view of a support arm cooperation.

The rotations of the ocular members 12, 14 and objective members 16, 18 are further linked by stops 80 shown in FIGS. 5, 6 and 7. The stops 80 cause the ocular members to rotate from the uncoupled state into the coupled state when the objective member 16, 18 are rotated from the closed position shown in FIG. 3 to the fully opened shown in FIGS. 1, 2 and 5. The stereoscope apparatus 10 changes from the coupled state to the uncoupled state when the objective members 16, 18 are rotated from the orientation shown in FIG. 8 to the closed position shown in FIG. 3. Thereby, full operation of the stereoscope apparatus 10 can be carried out by actively rotating the objective members 16, 18 without the need to actively rotate or handle the ocular members 12, 14.

With the left and right ocular members 12, 14 coupled to the respective objective members 16, 18, the left objective window 46 cooperates with the left ocular window 24, and the right objective window 48 cooperates with the right ocular window 26. When coupled, rotating either objective member 16, 18 also rotates the corresponding coupled ocular member 12, 14.

The objective members 16, 18 are linked to the respective ocular members 12, 14 by the common linkage system 20. The common linkage system 20 includes a plurality of support arms 40, 41 as illustrated in FIGS. 1, 3 and 5. Preferably, there are two support arms 40 or 41 attached to each member 12, 14, 16, 18. Each support arm 40, 41 is attached to a member 12, 14, 16, 18 and includes an aperture 64 therethrough. The apertures 64 within the support arms 40, 41 are aligned to collectively define a through-bore 66, into which a cylindrical pin 68 is inserted to operably connect each support arm 40, 41. Preferably, each end of the cylindrical pin 68 is crimped to keep the pin 68 operably connected to each support arm 40, 41. However, other means such as a threaded nut and bolt may be used to operably connect the support arms 40, 41.

There are two basic configurations for the support arms 40, 41. The support arms 41 attached to the ocular members 12, 14 have a bent configuration, as illustrated in FIGS. 6 and 7, while the support arms 40 attached to the objective members 16, 18 have a straight configuration, as illustrated in FIGS. 6 and 7.

Figure 9:
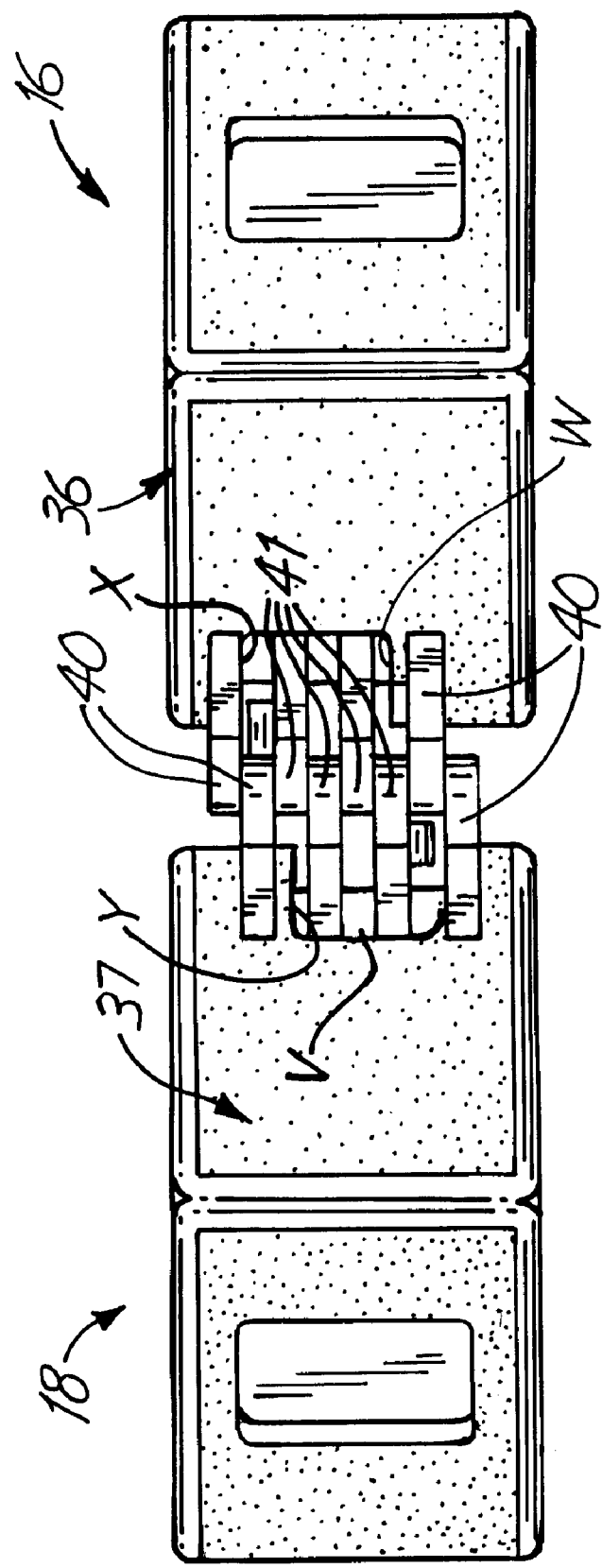
FIG. 9 is a plan view of a backside of the present invention

The support arms 40, 41 are positioned adjacent to one another, as best illustrated in FIG. 5. The support arms 40, 41 are ordered along the pin 68 so that the support arms 41 attached to the ocular members are near the middle of the pin 68 while the support arms 40 attached to the objective members are near the ends of the pin. The first legs 36, 37 of the objective members 16, 18 have surfaces X, Y which define through spaces W, V for the ocular support arms 41 to pass through as illustrated in FIG. 9.

Engagement dentents 70 are positioned on the ocular support arms 41 such that in the coupled state, an engagement detent 70 is directly adjacent to each side of the surfaces X, Y on legs 36, 37. The surfaces X, Y preferably have a denticular profile. The detents 70 elastically engages the legs 36, 37 thereby causing the rotation of the ocular members 12, 14 to be coupled to the rotation of the objective members 16, 18, respectively.

The support arms 41 additionally have stops 80 which couple the rotation of the left objective member 16 to the right ocular member 14 and the right objective member 18 to the left ocular member 12. The location of the stops 80 are best seen in FIG. 5. The engagement of the stops 80 is best seen in FIGS. 6 and 7. As the stereoscope apparatus 10 transitions between the coupled and uncoupled states, the linkage system 20 must elastically deform as the surfaces X, Y slide over the dentents 70. This elastic deformation requires that extra force be applied by the user. When transitioning into the uncoupled state from the position shown in FIG. 8, the extra force can be applied directly to the objective members 16, 18 by pushing them inward. When transitioning into the coupled state in the fully opened position shown in FIGS. 1, 2, and 5, the extra force applied to the objective members 16, 18 is transferred to the ocular members 14, 12, respectively through the stops 80.

As the objective members 16, 18 are rotated from the first position as illustrated in FIG. 3 to the fully opened position as illustrated in FIGS. 1, 2 and 5, the coupled state is preferably reached when the left and the right ocular members 12, 14 have approximately 180 degrees of rotation relative to each other, and the left and right member 16, 18 have approximately up to 270 degrees of rotation relative to each other.

Figure 8:
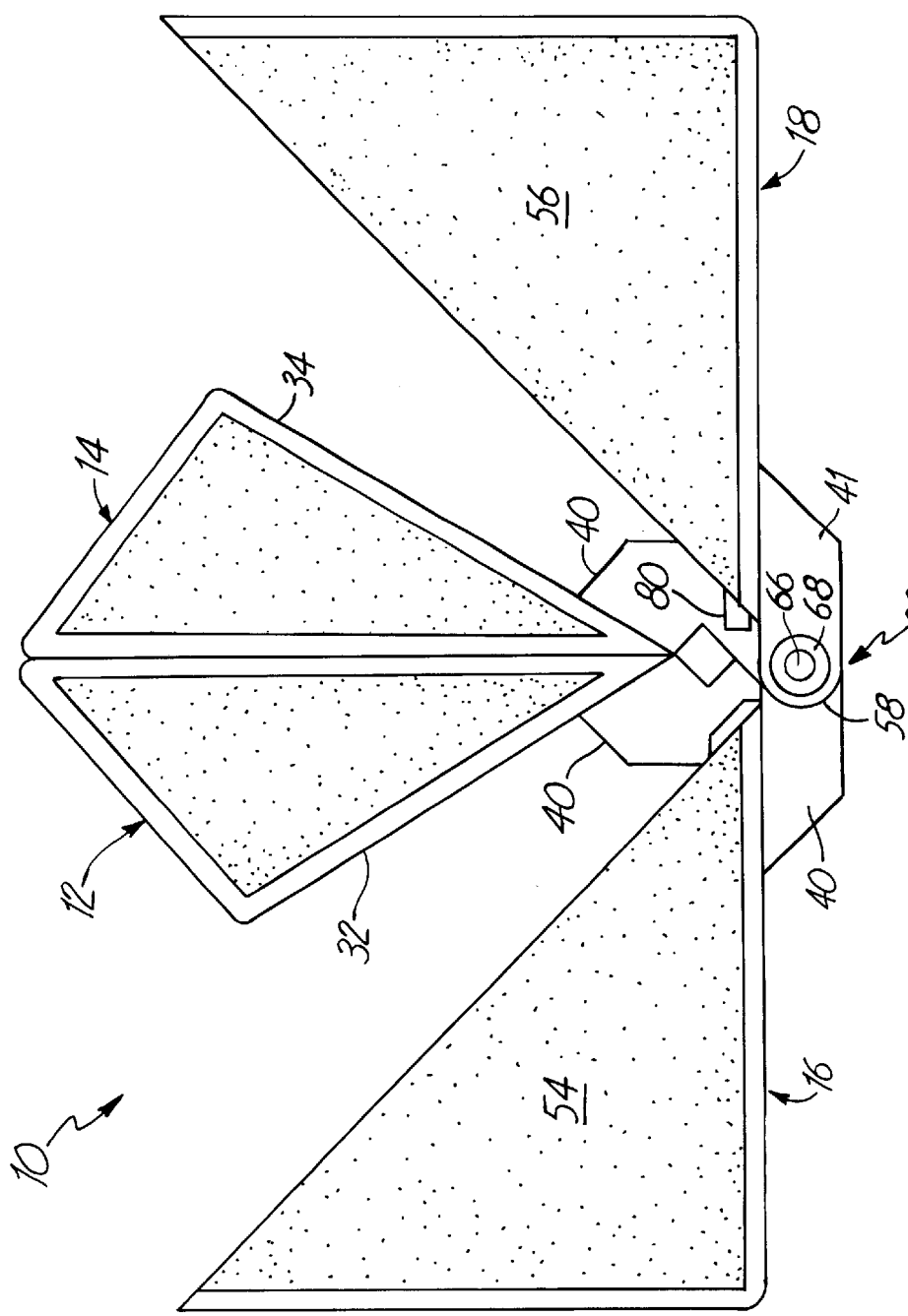
FIG. 8 is a side view of the present invention in a position between the fully open position and the closed position.

Once the left and right ocular members 12, 14 are coupled to the respective cooperating objective members 16, 18, the left ocular member 12 and left objective member 16 are adjustable with respect to the right ocular member 14 and right objective member 18. The left and right ocular members 12, 14 remain coupled with the respective left and right objective members 16, 18 through approximately the first 180 degrees of rotation from the fully opened position toward the closed position. Near 180 degrees of rotation, the left and right ocular members contact each other as illustrated in FIG. 8. When a sufficient force is applied to the objective member 16, 18, the elastic engagement is overcome, thus de-coupling the left and right ocular members 12, 14 from the respective objective members 16, 18. The objective members 16, 18 can then be rotated to the first position, after which the objective members 16, 18 enclose the ocular members 12, 14, as illustrated in FIG. 3. The objective windows 46, 48 act as adjustable masks. The rotation of the objective members 16, 18 near the fully opened position provides a septum of varying width (which is analogous to a septum of varying length).

The ocular windows 24, 26 of the present invention are of a width sufficient enough to accommodate a range of distances between the user's left and right eyes. As the objective windows 46, 48 are adjusted for a particular stereo-paired image, the separation between the ocular windows 24, 26 changes by a negligible amount, thereby continuing to accommodate a vast range of distances between the viewer's left and right eyes.

As previously mentioned, the size of the objective windows 46, 48 is larger than the ocular windows 12, 14. As the stereoscopic viewing apparatus 10 is positioned further away from a user's eyes, the fused three-dimensional image is cropped because the ocular windows 24, 26 are smaller than the objective windows 46, 48. This compels the user to keep the stereoscopic viewing apparatus 10 a minimal distance from the user's eyes. By restricting the position of the stereoscopic viewing apparatus 10 proximate a user's eyes, the operation of the stereoscopic viewing apparatus 10 is stabilized. This stabilization of the operation of the stereoscope is the result of having separate ocular and objective elements whereby the objective elements are adjustable. The optimal adjustment of the objective windows 46, 48 is a function of the distance between the user and the stereo-paired images and the separation of the stereo-paired images.

A person skilled in the art will appreciate that by fixing the position of the stereoscopic viewing apparatus 10 proximate a user's eyes, the operation of the stereoscope 10 becomes much more intuitive. The user moves toward or away from the stereo-image pair being viewed in order to obtain the desired horizontal field of view of the stereo-image pair. The user then adjusts the separation of the objective windows 46, 48 to mask the periphery symmetrically around the stereo-images. The amount of adjustment depends upon the relative separation of the stereo image pairs.

Although the present invention has been described with reference to preferred embodiments, workers skilled in the art will recognize that changes may be made in form and detail without departing from the spirit and scope of the invention.

What is claimed is:

1. A stereoscopic viewing apparatus comprising:
    a pair of left and right spaced-apart ocular members, each ocular member comprising:
        a support arm with an aperture therethrough; and
        a surface defining an ocular window;
    a pair of left and right spaced-apart objective members, each objective member comprising:
        a support arm with an aperture therethrough; and
        a surface defining an objective window; and
    a common linkage defined by an alignment of the apertures of each ocular member and each objective member with a pin insertable therethrough, wherein the common linkage allows each ocular member and each objective member to be rotatably positionable with respect to one another in a plane that is perpendicular to both a plane containing each ocular member and a plane containing each objective member.

2. The stereoscopic viewing apparatus of claim 1 wherein each objective member comprises:
    a first leg extending away from the common linkage; and
    a second leg extending away from the first leg, the second leg containing the objective window.

3. The stereoscopic viewing apparatus of claim 1 wherein each ocular member further comprises a lens positioned proximate the ocular window.

4. The stereoscopic view apparatus of claim 3 wherein each lens is a prism lens.

5. The stereoscopic viewing apparatus of claim 1 and further comprising a system of stops positioned upon the support arms of the ocular members and the objective members, the system of stops engaging each support arm such that the left ocular member engages the right objective member and the right ocular member engages the left objective member.

6. The stereoscopic viewing apparatus of claim 1 wherein the objective members are rotatably positionable to enclose the ocular members.

7. The stereoscopic viewing apparatus of claim 1 and further comprising a system of dentations positionable upon each support arm, the dentations coupling the left objective member to the left ocular member and the right objective member to the right ocular member.

8. The stereoscopic viewing apparatus of claim 1 wherein each objective window has a dimension greater than a respective ocular window dimension, each objective window visible through the respective ocular window.

9. The stereoscopic viewing apparatus of claim 8 wherein the left objective window masks left and right peripheries of a left stereo image, and the right objective window masks left and right peripheries of a right stereo image.

10. The stereoscopic viewing apparatus of claim 1 wherein either ocular member and the respective objective member are rotatably positionable to align either ocular window and the respective objective window in optical cooperation with one another.

11. The stereoscopic viewing apparatus of claim 10 wherein either ocular member is coupled to the respective objective member when either ocular window is aligned in optical cooperation with the respective objective window.

12. A stereoscopic viewing apparatus comprising:
   a hinge;
   a pair of left and right, spaced-apart ocular members, each ocular member comprising a surface defining an ocular window;
   a pair of left and right, spaced-apart adjustable objective members, the left objective member couplable to the left ocular member and the right objective member couplable to the right ocular member, each objective member comprising:
      a first leg having a first end and a second end, the first end attachable to and extending away from the hinge; and
      a second leg attachable to and extending from the second end of the first leg, the second leg comprising a surface defining an objective window; and
   wherein each objective member is rotatably positionable in a plane that is perpendicular to both a plane containing each ocular member and a plane containing each objective member, each objective window and respective ocular window alignable in optical cooperation, each objective window positionable a selected distance from the respective ocular window.

13. The stereoscopic viewing apparatus of claim 12 wherein each objective member is coupled to the respective ocular member when the left and right objective windows are aligned in optical cooperation and positioned a selected distance from the respective ocular window.

14. The stereoscopic viewing apparatus of claim 12 wherein the objective members are rotatably positionable to enclose the ocular members.

15. The stereoscopic viewing apparatus of claim 12 wherein the ocular members are adjustably attachable to the hinge.

16. The stereoscopic viewing apparatus of claim 15 wherein either objective member engages the non-respective ocular member through a selected range of rotational positions.

17. The stereoscopic viewing apparatus of claim 12 wherein each objective window has a dimension greater than a respective ocular window dimension.

18. The stereoscopic viewing apparatus of claim 17 and further comprising:
   a first lens positionable proximate the left ocular window; and
   a second lens positionable proximate the right ocular window.

19. The stereoscopic viewing apparatus of claim 18 wherein the first lens and the second lens each comprise a prism lens.

* * * * *